(12) United States Patent
Sickels et al.

(10) Patent No.: US 9,545,687 B2
(45) Date of Patent: Jan. 17, 2017

(54) SPOOL GUN ADAPTER

(75) Inventors: Darrell Lee Sickels, Troy, OH (US); Brian Scott Bashore, Tipp City, OH (US)

(73) Assignee: HOBART BROTHERS COMPANY, Troy, OH (US)

( * ) Notice: Subject to any disclaimer, the term of this patent is extended or adjusted under 35 U.S.C. 154(b) by 546 days.

(21) Appl. No.: 13/323,097

(22) Filed: Dec. 12, 2011

(65) Prior Publication Data

US 2012/0152923 A1 Jun. 21, 2012

Related U.S. Application Data

(60) Provisional application No. 61/424,151, filed on Dec. 17, 2010.

(51) Int. Cl.
*B23K 9/12* (2006.01)
*B23K 9/32* (2006.01)
*B23K 9/10* (2006.01)

(52) U.S. Cl.
CPC .. *B23K 9/32* (2013.01); *B23K 9/10* (2013.01)

(58) Field of Classification Search
CPC ............ B23K 9/0956; B23K 9/10; B23K 9/09
USPC .... 219/137.7, 137, 138, 98, 137.42, 137.63, 219/137.31, 130.21; 363/23
See application file for complete search history.

(56) References Cited

U.S. PATENT DOCUMENTS

| 2,064,172 | A | | 12/1936 | Lofstedt |
| 2,383,291 | A | | 8/1945 | Cook |
| 2,871,333 | A | | 1/1959 | Savage |
| 3,143,633 | A | | 8/1964 | Wadleigh |
| 3,210,522 | A | | 10/1965 | Adamson |
| 3,371,580 | A | | 3/1968 | Barnes |
| 3,413,893 | A | | 12/1968 | Wilson |
| 3,552,264 | A | | 1/1971 | Meinke |
| 3,581,051 | A | * | 5/1971 | Brown ...................... 219/130.5 |
| 3,682,560 | A | | 8/1972 | Suizu |
| 3,859,001 | A | | 1/1975 | Hoddinott |
| 3,976,386 | A | | 8/1976 | Marantette |
| 5,410,126 | A | * | 4/1995 | Miller et al. ............... 219/130.1 |
| 5,491,321 | A | | 2/1996 | Stuart et al. |
| 5,743,685 | A | | 4/1998 | Piggott |
| 5,824,990 | A | * | 10/1998 | Geissler et al. ......... 219/130.21 |
| 6,066,834 | A | | 5/2000 | Rebold |

(Continued)

FOREIGN PATENT DOCUMENTS

GB         186314         6/1923

OTHER PUBLICATIONS

International Search Report & Written Opinion of PCT/US2012/030257 dated Jun. 29, 2012.

(Continued)

*Primary Examiner* — David Angwin
*Assistant Examiner* — Lawrence Samuels
(74) *Attorney, Agent, or Firm* — Fletcher Yoder P.C.

(57) ABSTRACT

The present disclosure provides a welding system having a welder, a welding gun, and a welding gun adapter, the welding gun being a spool gun with an attached motor. The welding gun adapter receives welding power from the welder, and converts it to output power suitable for driving the motor of the welding gun. The welding gun adapter also uses received welding power from the welder for control power. The present techniques allow for the use of welding guns requiring motor power to be used with any ordinary welder.

14 Claims, 5 Drawing Sheets

(56) References Cited

U.S. PATENT DOCUMENTS

| | | | |
|---|---|---|---|
| 6,479,795 B1 | 11/2002 | Albrecht | |
| 6,858,818 B2 * | 2/2005 | Knoener | B23K 9/0953 |
| | | | 219/130.5 |
| 6,906,285 B2 * | 6/2005 | Zucker | B23K 9/124 |
| | | | 219/132 |
| 7,005,610 B2 * | 2/2006 | Ihde et al. | 219/137.71 |
| 7,041,937 B2 * | 5/2006 | Ihde et al. | 219/137.71 |
| 7,128,506 B2 | 10/2006 | Ferrari | |
| 7,208,699 B2 | 4/2007 | Stanzel | |
| 7,235,759 B2 * | 6/2007 | Geissler | 219/130.1 |
| 7,261,503 B2 | 8/2007 | Motta | |
| 7,294,808 B2 * | 11/2007 | Furman | B23K 9/095 |
| | | | 219/132 |
| 7,755,000 B2 | 7/2010 | Stanzel | |
| 8,581,565 B2 * | 11/2013 | Tang et al. | 323/283 |
| 2003/0121362 A1 | 7/2003 | Goellner | |
| 2003/0164645 A1 | 9/2003 | Crandell, III | |
| 2004/0173591 A1 * | 9/2004 | Knoener | B23K 9/0953 |
| | | | 219/130.5 |
| 2005/0045611 A1 * | 3/2005 | Ihde et al. | 219/137.71 |
| 2005/0067396 A1 * | 3/2005 | Kaufman et al. | 219/137.71 |
| 2005/0199605 A1 * | 9/2005 | Furman | B23K 9/095 |
| | | | 219/132 |
| 2006/0027546 A1 * | 2/2006 | Reynolds et al. | 219/132 |
| 2006/0037954 A1 * | 2/2006 | Silvestro | 219/133 |
| 2007/0000896 A1 * | 1/2007 | Meckler | 219/137.71 |
| 2007/0119840 A1 * | 5/2007 | Flattinger et al. | 219/137.31 |
| 2007/0158313 A1 * | 7/2007 | Stanzel | 219/74 |
| 2009/0302018 A1 * | 12/2009 | Diekmann et al. | 219/137.2 |
| 2010/0178125 A1 | 7/2010 | Tatsuda | |
| 2010/0213179 A1 * | 8/2010 | Peters | 219/121.64 |
| 2010/0301030 A1 * | 12/2010 | Zhang et al. | 219/130.1 |
| 2010/0314369 A1 * | 12/2010 | Kaufman | 219/130.1 |
| 2011/0014001 A1 | 1/2011 | Takahashi | |
| 2011/0131791 A1 | 6/2011 | Haas | |
| 2011/0220628 A1 * | 9/2011 | Mehn | B23K 9/124 |
| | | | 219/130.1 |
| 2011/0220630 A1 * | 9/2011 | Speilman et al. | 219/137 R |

OTHER PUBLICATIONS

Hobart Welding Products, 3035 Spool Gun, http://www.hobartwelders.com/products/wirefeed/spoolguns/3035/.
Hobart Welding Products, DP-3035 Spool Gun, http://www.hobartwelders.com/products/wirefeed/spoolguns/dp-3035.
Hobart Welding Products, 3545 Spool Gun, http://www.hobartwelders.com/products/wirefeed/spoolgun/3545/.
Hobart Welding Products, DP-3545 Spool Gun, http://www.hobartwelders.com/products/wirefeed/spoolgun/dp-3545/.
Miller Electric Mfg. Co. Spoolmate 100, http://www.millerwelds.com/products/wirefeeders/spoolmate100_series/.
Miller Electrick Mfg. Co., Spoolmate 3035, http://www.millerweldscm/products/wire_feeders/spoolmate_3035/.
Miller Electric Mfg. Co., Spoolmate 200, http://www.millerwelds.com/products/wire_feeders/spoolmate_200_series/.
Miller Electric Mfg. Co., Spoolmatic 30A, http://www.millerwelds.com/products/wire_feeders/pistol_grip_-_spoolmatic_30a/.
Hobart Welding Products, SpoolRunner 100, Jul. 2011, http://www.hobartwelders.com/pdf/spec_sheets/SpoolRunner_100.pdf.
Hobart Welding Products, Handler 190: 230V Wire Feed Welder, Jan. 2013, http://www.hobartwelders.com/pdf/spec_sheets/Handle_190.pdf.
Hobart Welders, Handler 190 and H100S4-10 Gun: Owner's Manual, Jun. 2011, p. 19, http://www.hobartwelders.com/om/6digit/o248841a_hob.pdf.

\* cited by examiner

SPOOL GUN ADAPTER

CROSS REFERENCE TO RELATED APPLICATIONS

This application claims priority from and the benefit of U.S. Provisional Patent Application No. 61/424,151, filed Dec. 17, 2010, entitled "Spool Gun Interface."

BACKGROUND

The present disclosure relates generally to welding equipment, including welders and welding guns. Specifically, the present disclosure relates to an adapter for use between a welder and a spool gun.

Many small wire welders that are available are equipped with a welding gun for the purpose of delivering welding wire to a welding arc to be consumed as a filler metal in a weldment. Typically, the welding wire is pushed through a gun cable by a welding wire drive mechanism located in the welder. However, when welding with a soft filler metal, such as aluminum, the feeding of the welding wire through the welding gun may be problematic as soft welding wire is prone to binding in some welding guns. The welding wire feeding issues encountered may cause temporary or total arc outages. In the worst case, the wire may feed back into the welder, causing a "bird's nest" of welding wire in the welding wire drive mechanism.

One method for resolving this issue is to employ a welding gun with a shorter welding wire travel path to minimize the welding wire restrictions. Such a welding gun is known as a "spool gun" because the welding wire spool and welding wire drive mechanism are located in a handle end of the spool gun closest to the welding arc. This configuration allows softer filler metal welding wire to be delivered to the welding arc in a straight, short (e.g., approximately 10") path. Since the welding wire spool and welding wire drive mechanism are located in the spool gun rather than the welder, power must be provided to the spool gun to drive a motor within the spool gun.

Unfortunately, many existing welders are not readily adaptable to be used with a spool gun. Adapting a spool gun to a welder that is not "spool gun ready" may be an expensive and complicated exercise. This problem is exacerbated when the welder is a relatively low-cost welder.

BRIEF DESCRIPTION

In an exemplary embodiment, a welding system includes a welder, a welding gun, and a welding gun adapter. The welding gun adapter includes a welder interface configured to be coupled to the welder and further includes a welding gun interface configured to be coupled to the welding gun.

In another embodiment, a welding gun adapter includes a welder interface configured to be coupled to a welder, a welding gun interface configured to be coupled to a welding gun, and a circuit board configured to receive an input voltage from the welder to which the welder interface is coupled and output an output voltage to the welding gun to which the welding gun interface is coupled, wherein the output voltage is different than the input voltage.

In another embodiment, a method includes activating a trigger on the welding gun, wherein the trigger on the welding gun is configured to be a contact closure switch, closing a welding gun trigger circuit on a welder in response to activating the trigger on the welding gun, outputting a voltage at the welder, receiving the voltage from the welder at a welding gun adapter, powering a control board in the welding gun adapter with the received voltage, and driving a motor of a welding gun with the received voltage, wherein the motor is voltage-controlled through pulse width modulation by the control board.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
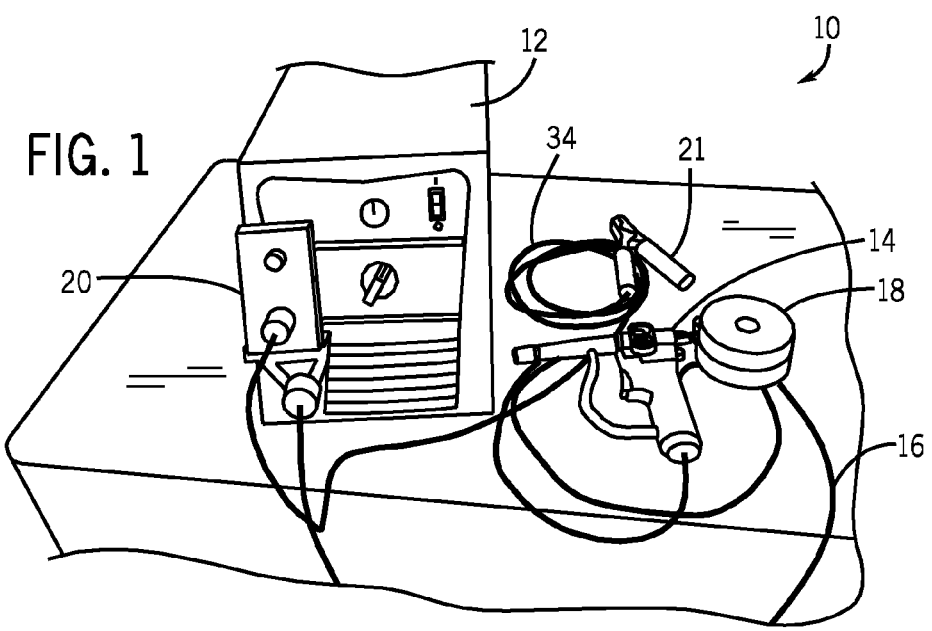
FIG. 1 is a perspective view of a welding system utilizing a welding gun adapter, in accordance with embodiments of the present disclosure.

The present disclosure provides a welding system wherein weld output power from a welder may be used to provide control power and motor power to a spool gun via a spool gun adapter. As such, the spool gun adapter presented herein provides a relatively inexpensive method of operating a spool gun with welders that may not be "spool gun ready." FIG. 1 is a perspective view of a welding system 10 utilizing such a spool gun adapter. The welding system 10 illustrated in FIG. 1 includes a welder 12, a welding gun 14 (e.g., such as a spool gun), a welding gun cable 16, and a welding gun adapter 20. In the illustrated embodiment, the welding gun 14 is a spool gun having a welding wire spool 18, the welding wire spool 18 being driven by a motor located on the welding gun 14. Additionally, the welding system 10 may also include a work clamp 21 and a work cable 34. The welding system 10, specifically the welder 12, will typically be coupled to a power source, such as a power grid. Other power sources may, of course, be utilized including generators, engine-driven power packs, and so forth. As described in greater detail below, the welder 12 may provide control power and motor power to the welding gun 14 via the welding gun adapter 20.

Figure 2:
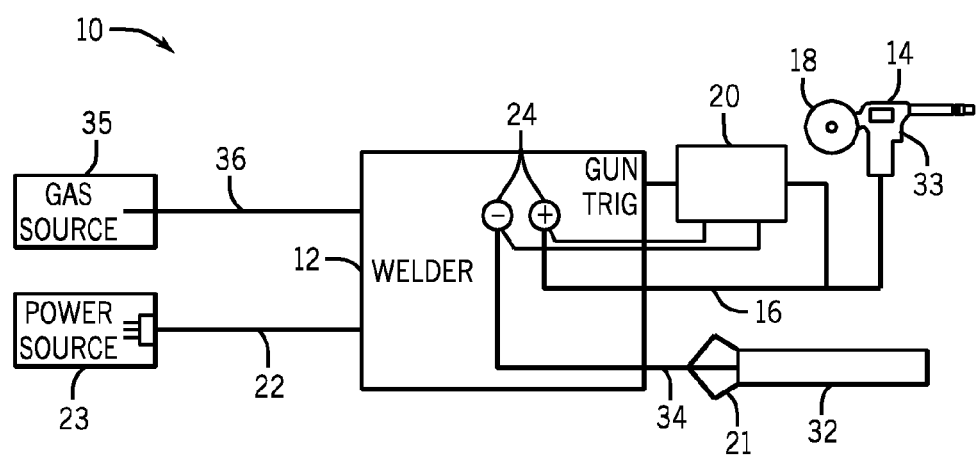
FIG. 2 is a diagrammatical representation of the welding system of FIG. 1, in accordance with embodiments of the present disclosure.

FIG. 2 is a diagrammatical representation of the welding system 10 of FIG. 1. As illustrated, the welder 12 receives AC power from a power source 23 via a power cord 22 and outputs welding power at a welder output 24. As illustrated, the welder output 24 includes a positive and a negative terminal. The welding gun 14 is coupled to a wire drive assembly 17 via the welding gun cable 16, the wire drive assembly 17 being coupled to the positive terminal of the welder output 24 via. The welding gun cable 16 may include a coaxial gas line (passage) inside the cable 16 to allow shielding gas to flow from the wire drive assembly 17 to the welding gun 14.

As described in greater detail below, welding power from the welder 12 is delivered to the welding gun 14 such that the welding gun 14 may produce a welding arc on a workpiece 32. The welding gun 14 will typically include the welding wire spool 18 of welding wire. The welding wire is advanced through the welding gun 14 by a welding wire drive assembly, typically through the use of an electric motor under the control of control circuitry within either the welding gun 14 or the welder 12. The workpiece 32 is coupled to the negative terminal of the welder output 24 via the work cable 34. The work cable 34, being coupled to the negative terminal of the welder output 24 on one end, may be coupled to the workpiece 32 on the opposing end via the work clamp 21, such that the workpiece 32 is electrically coupled to the negative terminal of the welder output 24, effectively "grounding" the workpiece 32 and completing a circuit from the welder 12 to the welding gun 14 to the workpiece 32 (via a welding arc) and back to the welder 12.

Additionally, as illustrated, the welder 12 is coupled to the welding gun adapter 20 via both the positive and negative terminals of the welder output 24, and supplies power to the welding gun adapter 20. The welding gun adapter 20 filters the power received from the welder 12 to be used for adapter circuit control and motor power for the connected welding gun 14. The welding gun 14 also includes a trigger 33, which when triggered, relays a trigger signal to a trigger circuit of the welder 12 via the welding gun adapter 20. When the trigger 33 of the welding gun 14 is triggered, the welder 12 supplies weld power to the welding gun 14 for establishing an arc, and to the welding gun adapter 20 for control power and power to drive the motor of the welding gun 14. Thus, when the trigger 33 of the welding gun 14 is triggered, the welding wire spool 18 feeds welding wire through the welding gun 14 to the welding arc created by welding power from the welder 12. As a result, the weld wire is molten, and a weld is made on the workpiece 32. In addition, in certain embodiments, the welding gun adapter 20 includes control circuitry, which regulates the feeding of welding wire from the welding wire spool 18 of the welding gun 14.

In certain embodiments, the welder 12 is also coupled to a shielding gas source 35 via a gas hose 36. To shield the weld area from being oxidized or contaminated during welding, to enhance arc performance, and to improve the resulting weld, the welder 12 feeds the shielding gas to the welding gun 14 via the welding gun cable 16, as previously mentioned. A variety of shielding materials for protecting the weld location may be employed, including inert shielding gas, including active gases, and particulate solids.

Figure 3:
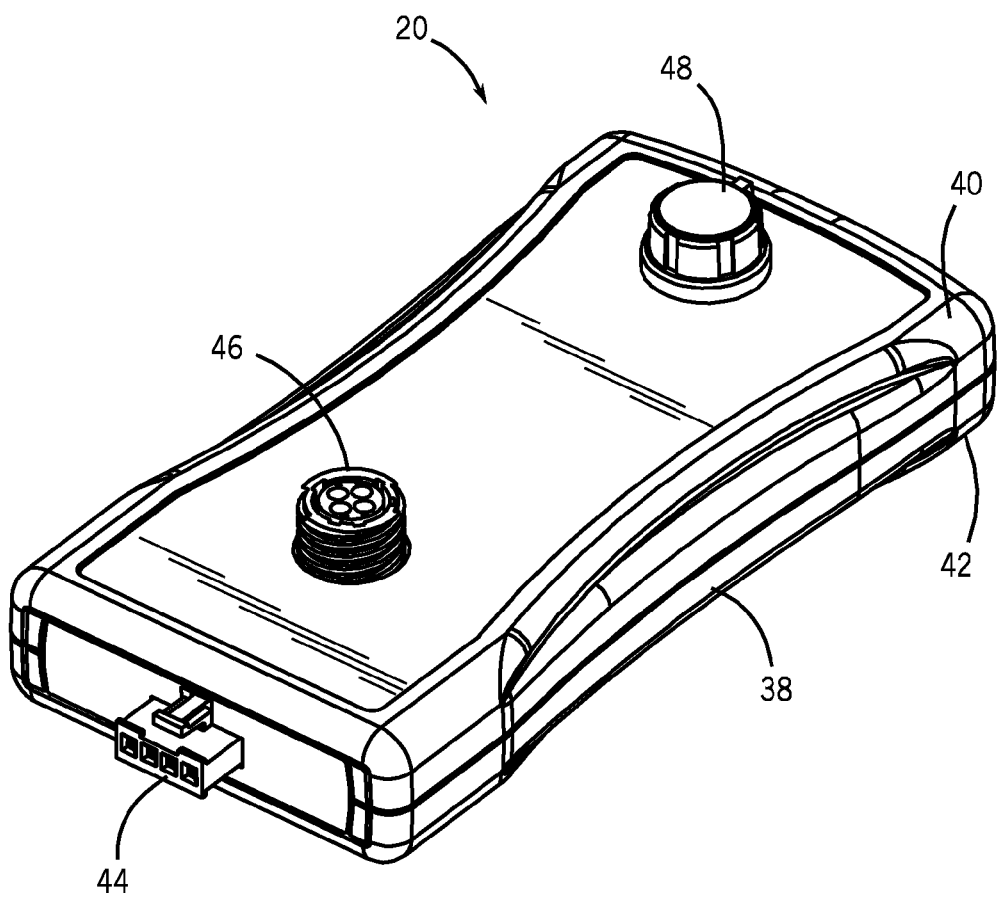
FIG. 3 is a perspective view of the welding gun adapter, in accordance with embodiments of the present disclosure.

FIG. 3 is a perspective view of an exemplary welding gun adapter 20. As illustrated, the welding gun adapter 20 includes an adapter housing 38 having a top cover 40 and a bottom cover 42. The welding gun adapter 20 also includes a welder connector 44 disposed on one side of the welding gun adapter 20. The welder connector 44 further includes four connections configured to connect to the welder output 24 terminals and the welder trigger circuit, as described above. Additionally, a welding gun connector 46 is disposed on another side of the welding gun adapter 20. The illustrated welding gun connector 46 includes a 4-pin receptor for receiving and coupling to the welding gun 14 via the welding gun cable 16. In certain embodiments, the welder connector 44 and the welding gun connector 46 may include different connector types other than those shown in FIG. 3. Likewise, certain embodiments may include welder connectors 44 and welding gun 46 connectors having different physical attachment mechanisms such as clips, locks, and so forth. Moreover, in certain embodiments, the physical location of the welder connector 44 and the welding gun connector 46 may be different than shown in FIG. 3.

Additionally, in certain embodiments, the welding gun adapter 20 includes a knob 48 disposed on a surface of the welding gun adaptor 20. The knob 48 provides a user interfacing mechanism that may be used to control the motor speed of the motor of the welding gun 14, how fast welding wire is delivered from the welding wire spool 18, and so forth. In certain embodiments, the knob 48 may be replaced with other user interfacing mechanisms for controlling motor speed, such as switches, buttons, sliders, and so forth. The welding gun adapter 20 may also include a physical attachment mechanism for securing the welding gun adapter 20 to the welder 12 as configured in FIG. 1. The attachment mechanism may include clips, holders, adhesives, and so forth. In certain embodiments, the welding gun adapter 20 may be configured to be attached to the welding gun 14. In other embodiments, the welding gun adapter 20 may be part of a cable connecting the welding gun 14 to the welder 12. The welding gun adapter 20 illustrated in FIG. 3 is one of many possible configurations of the welding gun adapter 20, including those of different size, shape, and arrangement of elements. Furthermore, certain embodiments may include other elements, such as additional inputs, outputs, and user interfacing elements that are not shown in the embodiment illustrated in FIG. 5.

Figure 4:
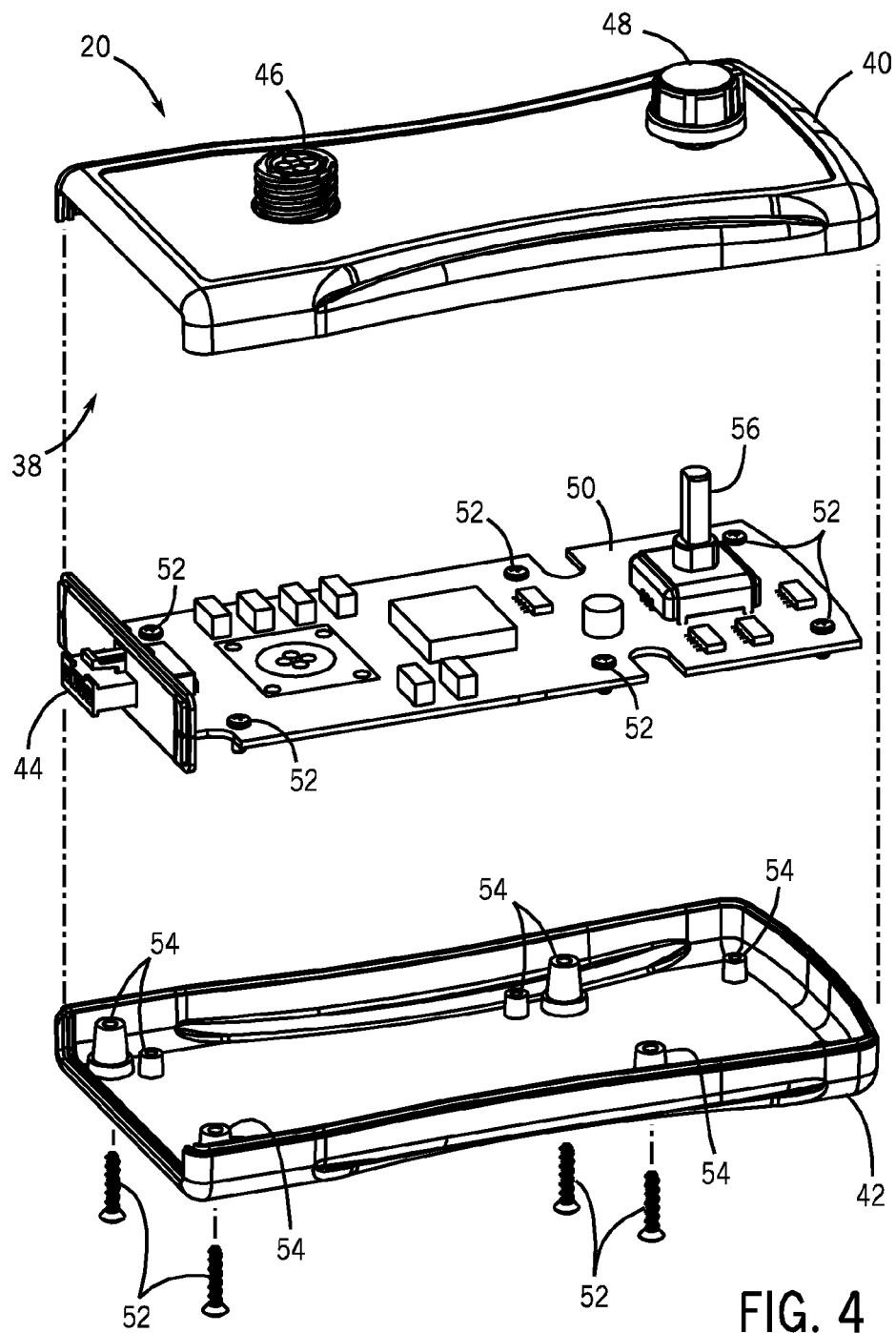
FIG. 4 is an exploded perspective view of the welding gun adapter having a housing structure and a circuit board, in accordance with embodiments of the present disclosure.

FIG. 4 is an exploded perspective view of the welding gun adapter 20 of FIG. 3. As illustrated, the welding gun adapter 20 includes a circuit board 50 disposed between the top cover 40 and the bottom cover 42 of the adapter housing 38. The circuit board 50 includes electronic components configured to establish an adapter circuit for carrying out the disclosed techniques, such as receiving power from the welder 12 and providing control power and motor power to the welding gun 14, the details of which are described in greater detail below. As illustrated in FIG. 4, the welder connector 44 is coupled to the circuit board 50 such that the power received from the welder 12 enters the adapter circuit, and also such that the trigger circuit of the welder 12 is coupled to the adapter circuit via the welder connector 44. Likewise, the welding gun connector 46 is also coupled to the circuit board 50. The welding gun adapter 20 couples to the welding gun 14 via the welding gun connector 46, providing power to the welding gun 14 and receiving a trigger signal from the trigger 33 of the welding gun 14. As such, the top cover 40 includes a through hole 45 which allows the welding gun connector 46 to be exposed when the adapter housing 38 is closed.

The circuit board 50 also includes a potentiometer 56 coupled to the adapter circuit. The potentiometer 56 is physically coupled to the knob 48 disposed on the surface of the welding gun adapter 20 such that the potentiometer 56 turns in a proportional manner when the knob 48 is turned. This allows a user to control the potentiometer 56, and hence the motor voltage and motor speed using the welding gun adapter 20. As illustrated, the circuit board 50 is disposed inside the adapter housing 38 such that the top cover 40 and the bottom cover 42 fully enclose the circuit board 50 when closed. Additionally, the circuit board 50 is supported and stabilized inside the adapter housing 38 by a plurality of screws 52 and standoffs 54. In the illustrated embodiment, the standoffs 54 are attached to the bottom cover 42 such that the circuit board 50 may be configured to sit on top of the standoffs 54, leaving space between the circuit board 50 and the inside surface of the bottom cover 42, thereby enabling heat dissipation within the welding gun adapter 20. The standoffs 54 are designed to receive and hold a respective screw 52. Accordingly, the circuit board 50 also includes screw holes established on the circuit board 50 at corresponding locations such that the screw holes are generally aligned with the standoffs 54. Screws 52 are inserted into the screw holes of the circuit board 50 and screwed into the standoffs 54 such that the circuit board 50 is secured between the screw heads and the standoffs 54, and secured to the bottom cover 42. In the illustrated embodiment, the standoffs 54 and screw holes are generally placed near the edges of the bottom cover 42 and at corresponding locations on the circuit board 50, respectively. In certain embodiments, the standoffs 54 and screw holes may be placed in various locations and be varied in number. In some embodiments, the standoffs 54 may be attached to the top cover 40 rather than the bottom cover 42, with the circuit board 50 being secured to the top cover 40 rather than the bottom cover 42. Additionally, in certain embodiments, the circuit board 50 may be disposed and secured within the adapter housing 38 in a manner different than that described above. For example, the circuit board 50 may be held by grooves along inside edges of the adapter housing 38, or held by clips, and so forth.

The top cover 40 and the bottom cover 42 may be joined together to encase the circuit board 50, as shown in FIG. 3. In the illustrated embodiment, the top cover 40 and the bottom cover 42 are secured in a closed position by screws 52 that screw into and past the bottom cover 42 into screw receptacles at corresponding locations in the top cover 40. Thus, the screws 52 thread the bottom cover 42 and top cover 40 together, holding the top and bottom covers 40, 42 in a joined and closed position, housing the circuit board 50 inside. Alternatively, the adapter housing 38 may be joined together in a manner different that described above. For example, the adapter housing 38 may be closed by sliding one cover onto the other, employing a latch or clip closing mechanism, and so forth. In certain embodiments, the adapter housing 38 may instead be a one-piece housing, removing the need for top and bottom covers 40, 42.

Regardless of the specific features of the adapter housing 38, it is noted that the welding gun adapter 20 is relatively simple in design, including a relatively small number of main components (e.g., the adapter housing 38, the circuit board 50 that includes the adapter circuit, the potentiometer 56 connected to the knob 48, the welder connector 44, and the welding gun connector 46). As such, the welding gun adapter 20 may be manufactured relatively inexpensively, while providing the valuable benefit of adapting welders that are not "spool gun ready" with spool guns, such as the welding gun 14 described herein.

Figure 5:
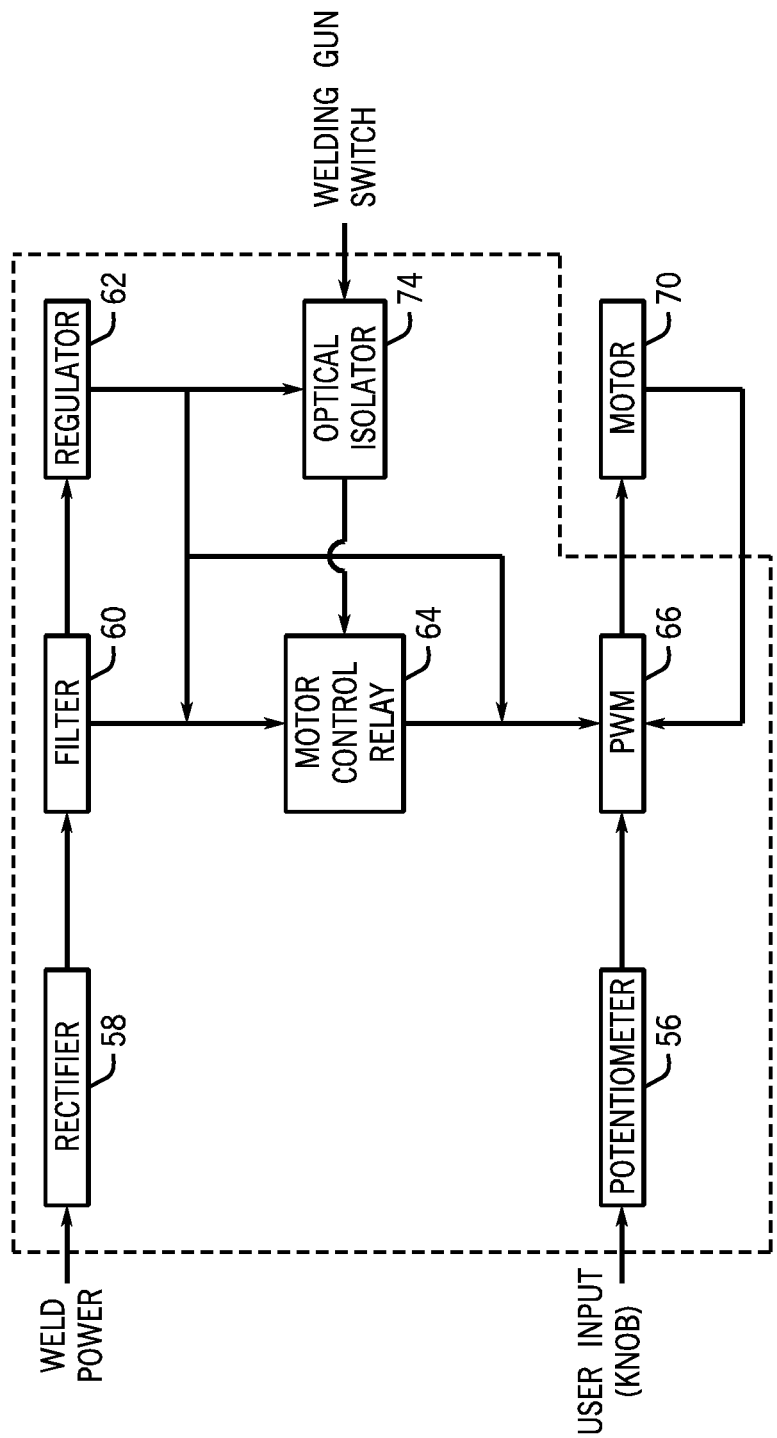
FIG. 5 is a block diagram illustrating the functionality of the welding gun adapter, in accordance with aspects of the present disclosure.
Figure 6:
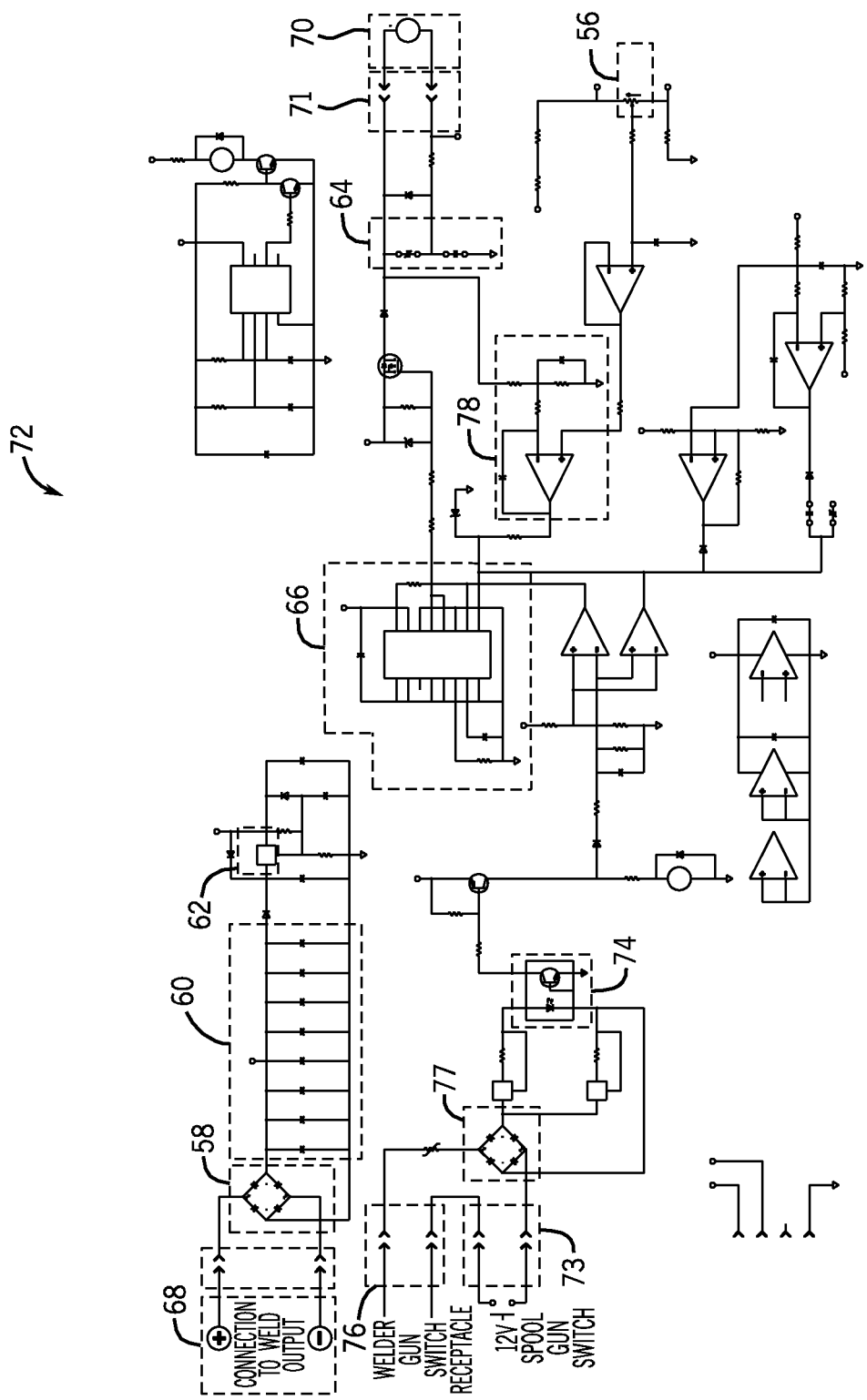
FIG. 6 is a circuit diagram of the welding gun adapter, in accordance with aspects of the present disclosure.

FIG. 5 is a block diagram of certain functionality of the adapter circuit 72 of the welding gun adapter 20 derived from the more detailed circuit diagram of the adapter circuit 72 illustrated in FIG. 6. As such, FIGS. 5 and 6 will be generally referred to concurrently to disclose both the theory and specific implementation of each portion of the adapter circuit 72 of the welding gun adapter 20 described herein. It will be appreciated that the functionality and associated circuitry of the adapter circuit 72 illustrated in FIGS. 5 and 6 is embodied on the circuit board 50 illustrated in FIG. 4. As illustrated in FIG. 5, the adapter circuit 72 of the welding gun adapter 20 generally includes a rectifier 58, a filter 60, a regulator 62, a motor control relay 64, a pulse width modulator 66, an optical isolator 74, and the potentiometer 56. As illustrated, the adapter circuit 72 of the welding gun adapter 20 also interacts with a motor 70 of the welding gun 14.

Referring now to FIG. 6, as described above, in certain embodiments, the welding gun adapter 20 may include four connections to the welder 12 (e.g., via the welder connector 44 illustrated in FIGS. 3 and 4). Two of the connections are power input connections 68 which connect to the welder output 24 of the welder 12. The other two connections are trigger circuit connections 76 connected to the trigger circuit of the welder 12. Specifically, welder output power enters the welding adapter 20 through two of the four input receptacles (e.g., the power input connections 68) of the welder connector 44, one being a positive terminal and one being a negative terminal. The voltage received from the welder 12 is typically rectified by the rectifier 58, such that the connections are not polarity sensitive. The rectifier 58, the specific design of which is shown in FIG. 6, employs a diode bridge for rectifying the input voltage. The rectified voltage is generally filtered to approximately a +30 VDC supply by the filter 60. In the illustrated embodiment, this function may be accomplished by a plurality of capacitors, as shown. The filtered +30 VDC supply may provide motor power for the motor 70 of the welding gun 14. The filtered voltage is typically regulated to produce a +15 VDC supply, which generally provides control power for the welding gun adapter 20. In the illustrated embodiment, the regulator 62 employs a linear regulator as shown in FIG. 6.

As described above, the welding gun adapter 20 includes four connections to the welder 12, two being the power input connections 68 as discussed above. The remaining two connections are trigger circuit connectors 76, which connect the welding gun adapter 20 to the welding gun trigger circuit of the welder 12. The adapter circuit 72 is also connected to the trigger circuit of the welding gun 14 via the welding gun connector 46 (as illustrated in FIGS. 3 and 4). The welding gun connector 46 also includes four connections, two of which are for delivering motor power to the welding gun 14 (e.g., motor power connectors 71), and two of which are for communicating a trigger signal (e.g., gun trigger connectors 73) from the trigger 33 of the welding gun 14 to the adapter circuit 72.

The welding gun trigger circuit and the welder trigger circuit are coupled through circuitry in the adapter circuit 72 to form a system trigger circuit. As such, when the trigger 33 of the welding gun 14 is activated, a trigger signal is transmitted from the welding gun 14 to the welder 12. This allows the welder 12 to respond to the triggering of the welding gun 14 by providing power, etc. In contrast with conventional welding gun trigger circuits which generally reference a control voltage common to detect triggering, the gun trigger circuit of the welding gun adapter 20 works from a simple contact closure. More specifically, to overcome the lack of control circuit voltage common, the optical isolator 74 is employed to sense current in the system trigger circuit, as opposed to trying to sense voltage. When the trigger 33 is depressed or activated in the welding gun 14, the trigger signal is transmitted to the adapter circuit 72 via the gun trigger connectors 73, and the trigger circuit is closed. Current then flows from one terminal of the welder trigger receptacle (e.g., the trigger circuit connections 76) into the welding gun adapter 20, through a rectifying diode bridge 77, and through the optical isolator 74. As such, the connection is not polarity sensitive due to the rectifying diode bridge 77.

In certain embodiments, the optical isolator 74 includes a light-emitting diode and a photo-sensitive transistor. When current flows through the trigger circuit as a result of the gun trigger closure, the light-emitting diode lights, which bias the transistor on and turn the optical isolator 74 on. A gun trigger monitor toggles to an on state condition when the optical isolator 74 is turned on, as the welding gun 14 has been triggered. Additionally, when the optical isolator 74 turns on, current flows through the device, energizing the motor control relay 64. When the motor control relay 64 is energized, the normally-closed contacts that are connected across the spool gun motor winding are opened, and the normally-open contacts are closed, connecting the adapter circuit 72 to the control common, which allows motor current to flow.

When the motor control relay 64 is de-energized, the normally-closed contacts that are connected across the spool gun motor winding are closed, and the normally-open contacts are opened, disconnecting the adapter circuit 72 from control common, halting the motor current. The normally-closed contact closure across the motor winding acts as a "dynamic brake" for the motor 70, causing it to immediately stop with no coasting. This prevents the welding gun 14 from sending excess welding wire to the weld puddle after power from the welder output 24 of the welder 12 has been removed.

The pulse width modulator 66 controls the voltage, and thus speed, of the welding gun motor 70, which is also activated when the trigger circuit is enabled. The pulse width modulator 66 receives a reference voltage from the potentiometer 56, which outputs a voltage representing the desired motor speed as input by the user. The reference voltage from the potentiometer 56 is compared against a feedback voltage from the welding gun motor 70 by an operational amplifier 78. An error signal is generated from the difference between the reference voltage and the feedback voltage, representing the difference between the desired speed of the welding gun motor 70 and the actual speed of the welding gun motor 70. The error signal is supplied to a compensation pin of the pulse width modulator 66. As the speed of the welding gun motor 70 is determined by the feedback voltage, the pulse width modulator 66 regulates the voltage supplied to the welding gun motor 70 such that the speed of the welding gun motor 70 matches the desired speed. The pulse width modulator 66 regulates the welding gun motor 70 such that all of the motor control voltage levels are below the weld output voltage level.

In the present embodiment, the disclosed power characteristics of the system include a filtered +30 VDC supply for powering the welding gun motor 70 and a regulated +15 VDC supply for powering the control circuit of the welding gun adapter 20. Alternate embodiments may be configured to provide different voltages for these functions.

Additionally, the functional elements of the welding gun adapter 20 as well as the circuit elements and layout of the welding gun adapter 20 as illustrated in FIGS. 5 and 6 are representative in nature, and provide an exemplary schematic of the adapter electronics. It will be understood that the novel techniques of the present disclosure may be realized with different electronic elements and a circuit layout different than the one illustrated in FIGS. 5 and 6. For example, referring to FIG. 5, the welding gun adapter 20 may be realized without a rectifier 58 while preserving the novelty and technological advancement of the present disclosure. Certain embodiments may also employ different techniques for converting welding power received and transformed into the control power and motor power in place of the techniques described above.

As described above, the welding system 10 provides the welding gun adapter 20 for powering the motor 70 of the welding gun 14 using weld power from the welder 12. The welding gun adapter 20 also obtains its control power from the welder 12, eliminating the need for a separate power supply. The welding gun adapter 20 is relatively small in size, providing maneuverability and ease of use, though it may be configured to have a variety of shapes and sizes. The connections to the welder 12 and the welding gun 14 are intuitive and self-rectifying, reducing to the possibility of malfunctioning of the welding system 10. The welding system 10 allows the welding gun 14 to use shielding gas directly from the welder 12, rather than requiring a separate source. In addition, the welding gun adapter 20 is configured to receive an input of approximately 30 VDC from the welder 12, and to output a lower DC voltage to the welding gun 14, the welding gun 14 typically being a 12V welding gun. In certain embodiments, approximately 17.5 VDC may be provided to the welding gun 14. However, certain embodiments may be configured to be used with a welding gun 14 having a different voltage, such as a 24V welding gun. Such embodiments may include a boost circuit in the welding gun adapter 20 to boost the received welder power such that the voltage provided to the welding gun 14 for motor power is increased. Thus, a motor 70 with higher voltage needs may be supported by the welding gun adapter 20.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding spool gun adapter, consisting essentially of:
   an adapter housing comprising a top cover and a bottom cover;
   a welder interface comprising a side of the adapter housing abutting the top and bottom covers, wherein the welder interface is configured to be coupled to a welder;
   a welding spool gun interface extending through the top cover of the adapter housing; wherein the welding spool gun interface is configured to be coupled to a welding spool gun having a welding wire spool driven by a welding wire spool motor disposed in the welding spool gun;
   a circuit board enclosed within the adapter housing wherein the circuit board is configured to receive an input voltage via the welder interface from the welder to which the welder interface is coupled and to output an output voltage via the welding spool gun interface to the welding spool gun to which the welding spool gun interface is coupled, wherein the output voltage is different than the input voltage, and wherein the circuit board comprises a control circuit configured to provide controls for the welding spool gun, wherein the control circuit is configured to be powered by the input voltage received from the welder,
   wherein the controls for the welding spool gun comprise controls for receiving a trigger command from the welding spool gun to which the welding spool gun interface is coupled, and for providing response commands for manipulating the output voltage to drive the welding wire spool motor of the welding spool gun; and
   a motor speed adjustment knob disposed on the top cover of the adapter housing, wherein the motor speed adjustment knob enables a user to manually adjust a relationship of the input voltage that is received via the welder interface to the output voltage that is output via the welding spool gun interface, wherein the output voltage usable to adjust a speed of the welding wire spool motor of the welding spool gun.

2. The welding spool gun adapter of claim 1, wherein the welding wire spool motor of the welding spool gun is configured to be voltage-controlled through pulse-width modulation.

3. The welding spool gun adapter of claim 1, wherein the welder interface comprises a connection to a welding trigger circuit of the welder.

4. The welding spool gun adapter of claim 3, wherein the welding trigger circuit of the welder is controlled by a contact closure.

5. The welding spool gun adapter of claim 1, wherein the circuit board is configured to receive the input voltage of approximately 30 volts DC, and the circuit board is configured to output the output voltage of approximately 12 volts DC.

6. The welding spool gun adapter of claim 1, wherein the circuit board is supported and stabilized inside the adapter housing by a plurality of standoffs extending from the top cover or the bottom cover and having screw holes through which screws may be inserted to hold the top and bottom covers together.

7. The welding spool gun adapter of claim 1, wherein the top and bottom covers are made of a plastic material.

8. The welding spool gun adapter of claim 1, wherein the motor speed adjustment knob is coupled to a potentiometer of the circuit board configured to enable adjustment of the speed of the welding wire spool motor of the welding spool gun.

9. The welding spool gun adapter of claim 1, wherein the motor speed adjustment knob is the only input device of the welding spool gun adapter.

10. The welding spool gun adapter of claim 1, wherein the welding spool gun adapter receives a constant weld voltage from the welder via the welder interface, and outputs a lower DC voltage to the welding spool gun via the welding spool gun interface.

11. The welding spool gun adapter of claim 10, wherein the welding wire spool motor of the welding spool gun is powered by the lower DC voltage received from the welding spool gun adapter.

12. The welding spool gun adapter of claim 1, wherein the welder interface comprises a positive connection to a positive terminal of the welder and negative connection to a negative terminal of the welder.

13. The welding spool gun adapter of claim 1, wherein the circuit board is powered by the input voltage.

14. The welding spool gun adapter of claim 1, wherein the adapter housing comprises one or more attachment mechanisms to hold the top and bottom covers together.

\* \* \* \* \*